United States Patent [19]
Caldwell

[11] Patent Number: 6,108,740
[45] Date of Patent: Aug. 22, 2000

[54] METHOD AND APPARATUS FOR TERMINATING A BUS SUCH THAT STUB LENGTH REQUIREMENTS ARE MET

[75] Inventor: Barry E. Caldwell, Hesston, Kans.

[73] Assignee: LSI Logic Corporation, Milpitas, Calif.

[21] Appl. No.: 09/172,563

[22] Filed: Oct. 14, 1998

[51] Int. Cl.$^7$ .................................................. G06F 13/40
[52] U.S. Cl. ............................................. 710/126; 326/30
[58] Field of Search ........................... 710/100, 126–132; 326/30

[56] References Cited

U.S. PATENT DOCUMENTS

| | | | |
|---|---|---|---|
| 4,476,543 | 10/1984 | Quinones et al. | 375/257 |
| 4,782,300 | 11/1988 | Bonaccio et al. | 324/509 |
| 4,831,283 | 5/1989 | Newton | 326/30 |
| 5,099,137 | 3/1992 | Lattin, Jr. | 307/147 |
| 5,467,453 | 11/1995 | Kocis | 395/281 |
| 5,536,176 | 7/1996 | Borchew et al. | 439/61 |
| 5,553,250 | 9/1996 | Miyagawa et al. | 395/309 |
| 5,586,271 | 12/1996 | Parrett | 395/283 |
| 5,613,074 | 3/1997 | Galloway | 395/280 |
| 5,635,852 | 6/1997 | Wallace | 326/30 |
| 5,638,402 | 6/1997 | Osaka et al. | 375/257 |
| 5,664,221 | 9/1997 | Amberg et al. | 395/829 |
| 5,680,555 | 10/1997 | Bodo et al. | 395/306 |
| 5,689,402 | 11/1997 | Ralston, Jr. | 361/686 |
| 5,706,447 | 1/1998 | Vivio | 359/309 |
| 5,729,154 | 3/1998 | Taguchi et al. | 326/30 |
| 5,949,252 | 9/1999 | Taguchi | 326/86 |
| 5,983,296 | 11/1999 | Lamkin et al. | 710/100 |

OTHER PUBLICATIONS

How to Mix Wide and Narrow Devices on a SCSI Bus; http://resource.simplenet.com/files/68_50_n.htm; pp. 1–5.

*Primary Examiner*—Ayaz R. Sheikh
*Assistant Examiner*—Sumati Lefkowitz

[57] ABSTRACT

A method of preserving signal integrity of buses is disclosed. One step of the method includes the step of forming between a first bus and a first bus port of a bus controller, a first stub that is no greater than a first maximum stub length allowed for the first bus by terminating the first bus with a first terminating circuit if (i) the first bus port does not have at least one device coupled thereto, and (ii) a second bus port of the bus controller does have at least one device coupled thereto. The method also includes the step of forming between the first bus and a second bus port of the bus controller, a second stub that is no greater than the first maximum stub length allowed by terminating the first bus with a second terminating circuit if (i) the first bus port does have at least one device coupled thereto, and (ii) the second bus port does not have at least one device coupled thereto. Apparatus for implementing the method are also disclosed.

20 Claims, 6 Drawing Sheets

METHOD AND APPARATUS FOR TERMINATING A BUS SUCH THAT STUB LENGTH REQUIREMENTS ARE MET

BACKGROUND OF THE INVENTION

The present invention relates generally to computer buses for transmitting data and, more particularly to preserving signal integrity on a SCSI bus by terminating the SCSI buses such that maximum stub length requirements are met.

A "bus" in a digital computer system is generally a set of parallel conductors for interconnecting major components of a digital computer system. The bus essentially transfers electrical signals from one component connected to the bus to another component connected to the bus. Buses of various types are present in virtually every digital computer system. One particular bus, called the Small Computer System Interface (SCSI) bus, is used widely for coupling a digital computer system to various peripheral devices such as disk drives, Redundant Arrays of Independent Disks (RAID) devices, Digital Audio Tape (DAT) drives, Compact Disk Read Only Memory (CD-ROM) drives, optical storage drives, printers, and scanners.

The SCSI bus is a local Input/Output ("I/O") bus that can be operated over a wide range of data rates. The primary object of the SCSI bus interface is to provide host computers with device independence within a class of devices. Accordingly, different disk drives, tape drives, printer, optical media drives, and other peripheral devices can be added to a host computer without requiring modifications to generic system hardware or software. Standards have been defined by the American National Standards Institute (ANSI) for different types of SCSI busses. In particular, the ANSI document, SCSI Parallel Interface-2, describes in detail the SCSI-2 standard, the disclosure of which is hereby incorporated by reference.

A requirement of the various SCSI standards is that each end of the SCSI bus be terminated to preserve signal integrity. This requirement is met by coupling a terminating circuit to each end of the SCSI bus in order to reduce signal reflections that would otherwise occur at the ends of the SCSI bus. One problem with terminating the SCSI bus arises in SCSI controllers having at least two bus ports for coupling SCSI devices to a single SCSI bus. If SCSI devices are coupled to two bus ports of the SCSI controller, then the SCSI controller resides in the middle of the SCSI bus. As a result, the SCSI bus is terminated at or near the last SCSI device coupled to each bus port. However, if SCSI devices are coupled to only one bus port of the SCSI controller, then the SCSI controller resides at one end of the SCSI bus. Accordingly, the SCSI bus is terminated at or near (i) the SCSI controller, and (ii) the last SCSI device that is coupled to the one bus port.

Due to the fact that termination of the SCSI bus at or near the SCSI controller is dependant upon whether SCSI devices are coupled to the bus ports of the SCSI controller, most modern SCSI controllers include a switchable terminating circuit for terminating the SCSI bus. The switchable terminating circuit terminates the SCSI bus in response to a control signal. The control signal may be generated in response to a mechanical switch being actuated, a control register being set, or a jumper being configured. Alternatively, newer SCSI controllers include a termination control circuit which (i) receives signals indicating whether SCSI devices are coupled to bus ports of the SCSI controller, and (ii) generates a control signal that causes the switchable terminating circuit to terminate the SCSI bus if the received signals indicate that the SCSI controller resides in the middle of the SCSI bus.

Another requirement of the various SCSI standards is that each stub coupled to the SCSI bus be no greater than a defined maximum stub length. The SCSI standards define a stub as any electrical path that is not part of the SCSI bus path. Moreover, the SCSI standards define the SCSI bus path as the electrical path between the terminating circuits that terminate the ends of the SCSI bus. Due to physical distances between the bus ports and other devices of the SCSI controller, maintaining proper stub lengths using conventional SCSI controller designs is highly difficult if not impossible. This is especially true for SCSI controllers which control multiple SCSI buses and use low differential voltage signal with a high signal edge slew rate.

Due to the nature of single ended signaling and lower transfer rates defined by early SCSI standards, strict adherence to the maximum stub length requirement was not crucial to preserving signal integrity across the SCSI bus. However, due to the nature of low differential signaling, higher transfer rates, and higher signal edge slew rates defined by newer SCSI standards, strict adherence to the maximum stub length requirement has become crucial to preserving data signal integrity across the SCSI bus. Accordingly, SCSI controller designs that were functional under early SCSI standards have become unworkable under the latest SCSI standards which have not only shortened the maximum stub length requirement but in practice actually require that the maximum stub length requirement be met.

What is needed, therefore, is a method and apparatus for preserving signal integrity on a SCSI bus by terminating a SCSI bus such that maximum stub length requirements are met.

SUMMARY OF THE INVENTION

In accordance with one embodiment of the present invention, there is provided a method of preserving signal integrity of buses. One step of the method includes forming between a first bus and a first bus port of a bus controller, a first stub that is no greater than a first maximum stub length allowed for the first bus by terminating the first bus with a first terminating circuit if (i) the first bus port does not have at least one device coupled thereto, and (ii) a second bus port of the bus controller does have at least one device coupled thereto. Another step of the method includes forming between the first bus and a second bus port of the bus controller, a second stub that is no greater than the first maximum stub length allowed by terminating the first bus with a second terminating circuit if (i) the first bus port does have at least one device coupled thereto, and (ii) the second bus port does not have at least one device coupled thereto.

Pursuant to another embodiment of the present invention, there is provided another method of preserving signal integrity of buses. One step of the method includes generating a first control signal if a first bus port of a bus controller does not have at least one device coupled thereto. Another step of the method includes forming between a first bus and the first bus port, a first stub that is no greater than a first maximum stub length allowed for the first bus by terminating the first bus in response to the first control signal generating step generating the first control signal.

Pursuant to yet another embodiment of the present invention, there is provided a bus controller for interfacing buses. The bus controller includes a first bus port, a second bus port, a first bus channel, a control circuit, a first terminating circuit, and a second terminating circuit. The first bus port and the second bus port are both operable to couple to devices. The first bus channel is coupled between the first bus port and the second bus and includes a first bus portion of a first bus. The first terminating circuit is operable to selectively terminate the first bus in response to a first control signal and is coupled to a first stub connection of the first bus channel via a first group of conductor lines that are no greater than a first maximum stub length allowed for the first bus. The first stub connection is located on the first bus channel within the first maximum stub length from the first bus port. The second terminating circuit is operable to selectively terminate the first bus in response to a second control signal and is coupled to a second stub connection of the first bus channel via a second group of conductor lines that are no greater than the first maximum stub length. The second stub connection is located on the first bus channel within the first maximum stub length from the second bus port. The control circuit is operable to control the first bus and is coupled to the first bus channel with a first stub that is no greater than the first maximum stub length.

It is an object of the present invention to provide an new method and apparatus for preserving signal integrity of a bus.

It is an object of the present invention to provide an improved method and apparatus for preserving signal integrity of a bus.

It is yet another object of the present invention to provide a method and system for automatically terminating a bus.

It is still another object of the present invention to provide a method and apparatus for automatically terminating a bus such that resulting stubs have a length no greater than a defined maximum stub length.

It is still yet another object of the present invention to provide a method and apparatus for automatically terminating multiple buses in a bus controller such that resulting stubs have a length no greater than a define maximum stub length.

The above and other objects, features, and advantages of the present invention will become apparent from the following description and the attached drawings.

DETAILED DESCRIPTION OF THE PREFERRED EMBODIMENT

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
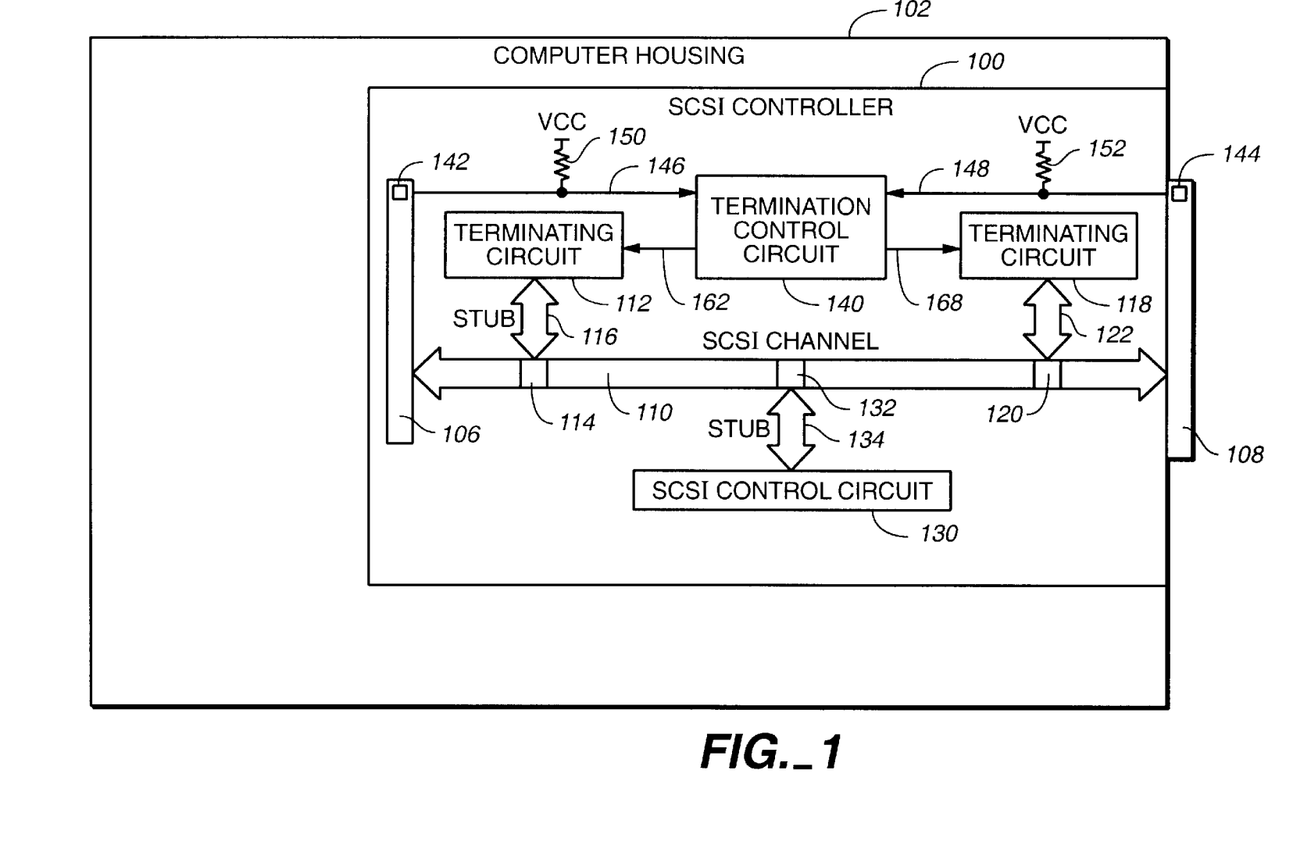
FIG. 1 shows a block diagram of SCSI controller which incorporates features of the present invention therein.

The SCSI bus is designed to provide an interface between computer systems and SCSI devices. Computer systems typically include a SCSI controller that manages data transfers between the computer system and the SCSI devices coupled to computer system via a SCSI bus. The SCSI controller is often implemented as (i) controller card seated in an expansion slot of the computer system's motherboard, or (ii) integrated directly into the computer system's motherboard. A SCSI controller 100 which incorporates features of the present invention therein is illustrated in FIG. 1.

As illustrated, the SCSI controller 100 is located within a computer housing 102 and includes two bus ports 106, 108 that are electrically coupled to each other by a SCSI channel 110. The first bus port 106 is referred to as an internal bus port because the first bus port 106 is used to couple LVD SCSI devices that are internal to the computer housing 102 to the SCSI channel 110. Similarly, the second bus port 108 is referred to as an external bus port because the second bus port 108 is used to couple LVD SCSI devices that are external to the computer housing 102 to the SCSI channel 110.

The SCSI controller 100 also includes a first terminating circuit 112 that is coupled to the SCSI channel 110 at a first stub connection 114 via a first group of conductor lines 116, and a second terminating circuit 118 that is coupled to the SCSI channel 110 at a second stub connection via a second group of conductor lines 122. In particular, the length of first group of conductor lines 116 are no greater than a maximum stub length allowed for the SCSI bus, and the first stub connection 114 is located on the SCSI channel 110 no greater than a maximum stub length distance from the internal bus port 106. Similarly, the length of the second group of conductor lines 122 are no greater than the maximum stub length allowed for the SCSI bus, and the second stub connection 120 is located on the SCSI channel 110 no greater than a maximum stub length distance from the external bus port 108. The significance of this coupling scheme will be discussed below in reference to FIGS. 2A, 2B, and 2C.

The two terminating circuits 112, 118 are used to terminate the SCSI bus if the SCSI controller 100 resides at one end of the SCSI bus. In a preferred embodiment of the invention, the terminating circuits 112, 118 are each implemented with four UCC5630 terminators manufactured by the Unitrode Corporation. Each UCC5630 terminator is a switchable LVD terminating circuit that includes an ENABLE input that when forced low (i.e. to electrical ground) causes the UCC5630 terminator to provide low voltage differential termination to 9 conductor line pairs that are coupled to the UCC5630 terminator.

The SCSI controller 100 further includes a control circuit 130 that is coupled to the SCSI channel 110 at a third stub connection 132 via a third group of conductor lines 134. In particular, the length of third group of conductor lines 134 are no greater than the maximum stub length allowed for the SCSI bus. The control circuit 130, in the preferred embodiment, is a SCSI controller chip 53C895 available from Symbios Logic Inc., Ft. Collins, Colo. The control circuit 130 essentially controls data transfers of the SCSI bus via data and control signals transmitted in accordance with the SCSI protocol. In particular, in the preferred embodiment of the SCSI controller 100, the SCSI controller is operable to transmit and receive low voltage differential (LVD) data signals at a transfer rate of 40 mega-transfers a second.

The SCSI controller 100 also includes a termination control circuit 140. The termination control circuit 140 is coupled to the internal bus port 106 and the external bus port 108 via an internal presence line 146 and an external presence line 148. The internal presence line 146 is coupled to a ground pin 142 of the internal bus port 106 and to a voltage VCC (e.g. 5 volts) via a first pull-up resistor 150. As a result of this connection scheme, the internal presence line 146 is (i) pulled down to a low value (i.e. ground) by a SCSI device when a SCSI device is coupled to the ground pin 142 of the internal bus port 106, and (ii) pulled up to a high value by the voltage VCC when a SCSI device is not coupled to the ground pin 142 of the internal bus port 106.

Similarly, the external presence line 148 is coupled to a ground pin 144 of the external bus port 108 and to the voltage VCC via a second pull-up resistor 152. As a result, the external presence line 148 is (i) pulled down to a low value (i.e. ground) by a SCSI device when a SCSI device is coupled to the ground pin 144 of the external bus port 108, and (ii) pulled up to a high value by the voltage VCC when a SCSI device is not coupled to the ground pin 144 of the external bus port 108.

Referring to TABLE 1 which lists the various signal lines included in a LVD wide SCSI-II bus, if the internal bus port 106 and the external bus port 108 are both wide LVD bus ports that are operable to couple to wide LVD SCSI devices, then the ground pins 142, 144 may be selected from the group of ground pins corresponding to connector contact numbers 15, 20, 22, 49, 54, and 56 without effecting the signal integrity of the SCSI bus.

TABLE 1

| Signal Name | Connector Contact Number | Connector Contact Number | Signal Name |
| --- | --- | --- | --- |
| +DB(12) | 1 | 35 | −DB(12) |
| +DB(13) | 2 | 36 | −DB(13) |
| +DB(14) | 3 | 37 | −DB(14) |
| +DB(15) | 4 | 38 | −DB(15) |
| +DB(P1) | 5 | 39 | −DB(P1) |
| +DB(0) | 6 | 40 | −DB(0) |
| +DB(1) | 7 | 41 | −DB(1) |
| +DB(2) | 8 | 42 | −DB(2) |
| +DB(3) | 9 | 43 | −DB(3) |
| +DB(4) | 10 | 44 | −DB(4) |
| +DB(5) | 11 | 45 | −DB(5) |
| +DB(6) | 12 | 46 | −DB(6) |
| +DB(7) | 13 | 47 | −DB(7) |
| +DB(P) | 14 | 48 | −DB(P) |
| GROUND | 15 | 49 | GROUND |
| DIFFSENS | 16 | 50 | GROUND |
| TERMPWR | 17 | 51 | TERMPWR |
| TERMPWR | 18 | 52 | TERMPWR |
| RESERVED | 19 | 53 | RESERVED |
| GROUND | 20 | 54 | GROUND |
| +ATN | 21 | 55 | −ATN |
| GROUND | 22 | 56 | GROUND |
| +BSY | 23 | 57 | −BSY |
| +ACK | 24 | 58 | −ACK |
| +RST | 25 | 59 | −RST |
| +MSG | 26 | 60 | −MSG |
| +SEL | 27 | 61 | −SEL |
| +C/D | 28 | 62 | −C/D |
| +REQ | 29 | 63 | −REQ |
| +I/O | 30 | 64 | −I/O |
| +DB(8) | 31 | 65 | −DB(8) |
| +DB(9) | 32 | 66 | −DB(9) |
| +DB(10) | 33 | 67 | −DB(10) |
| +DB(11) | 34 | 68 | −DB(11) |

The termination control circuit 140 is also coupled to the first terminating circuits 112 via a first enable line 162 and to the second terminating circuit 118 via a second enable line 168. The termination control circuit 140 is operable to selectively cause the terminating circuits 120, 122 to terminate the SCSI bus via the enable lines 162, 168 based upon the voltage level of the presence lines 146, 148. In particular, the termination control circuit 140 is operable to transmit a low voltage signal to the ENABLE inputs of the UCC5630 terminators of the first terminating circuit 112 via the first enable line 162 if the termination control circuit 140 determines that the first terminating circuit 112 should terminate the SCSI bus. Similarly, the termination control circuit 140 is operable to transmit a low voltage signal to the ENABLE inputs of the UCC5630 terminators of the second terminating circuit 118 via the second enable line 168 if the termination control circuit 140 determines that the second terminating circuit 118 should terminate the SCSI bus. Specifically, the termination control circuit 140 generates controls signals on the first enable line 162 and the second enable line 168 in accordance with TABLE 2, where "0" represents a low voltage signal (i.e. ground) and "1" represents a high voltage signal (i.e. VCC).

TABLE 2

| | Internal Presence Line 146 | External Presence Line 148 | First Enable Line 162 | Second Enable Line 168 |
| --- | --- | --- | --- | --- |
| 1 | 0 | 0 | 1 | 1 |
| 2 | 0 | 1 | 0 | 1 |
| 3 | 1 | 0 | 1 | 0 |
| 4 | 1 | 1 | 1 | 0 |

By generating the control signals for the enable lines 162, 168 in accordance with TABLE 2, the termination control circuit 140 not only causes the terminating circuits 112, 118 to properly terminate the SCSI bus, but also causes the resulting stubs connected to the SCSI bus to be no greater than a maximum stub length. The SCSI-II standard allows stubs connected to a LVD SCSI bus to be no greater than 0.1 meters (approximately 4 inches). The SCSI-II standard defines a stub as any electrical path that is not part of the SCSI bus path, defines the SCSI bus path as the electrical path between the terminating circuits that terminate the ends of the SCSI bus, and defines the connection of a stub to the SCSI-bus path as a stub connection. While the SCSI-II standard defines the maximum stub length at approximately 4 inches for an LVD SCSI bus, in practice I have found that stub lengths greater than 3 inches in most cases do not provide a SCSI bus having adequate data integrity. Accordingly, the SCSI controller 100, in the preferred embodiment, attempts to create stubs that are no greater than 3 inches in length.

Figure 2A:
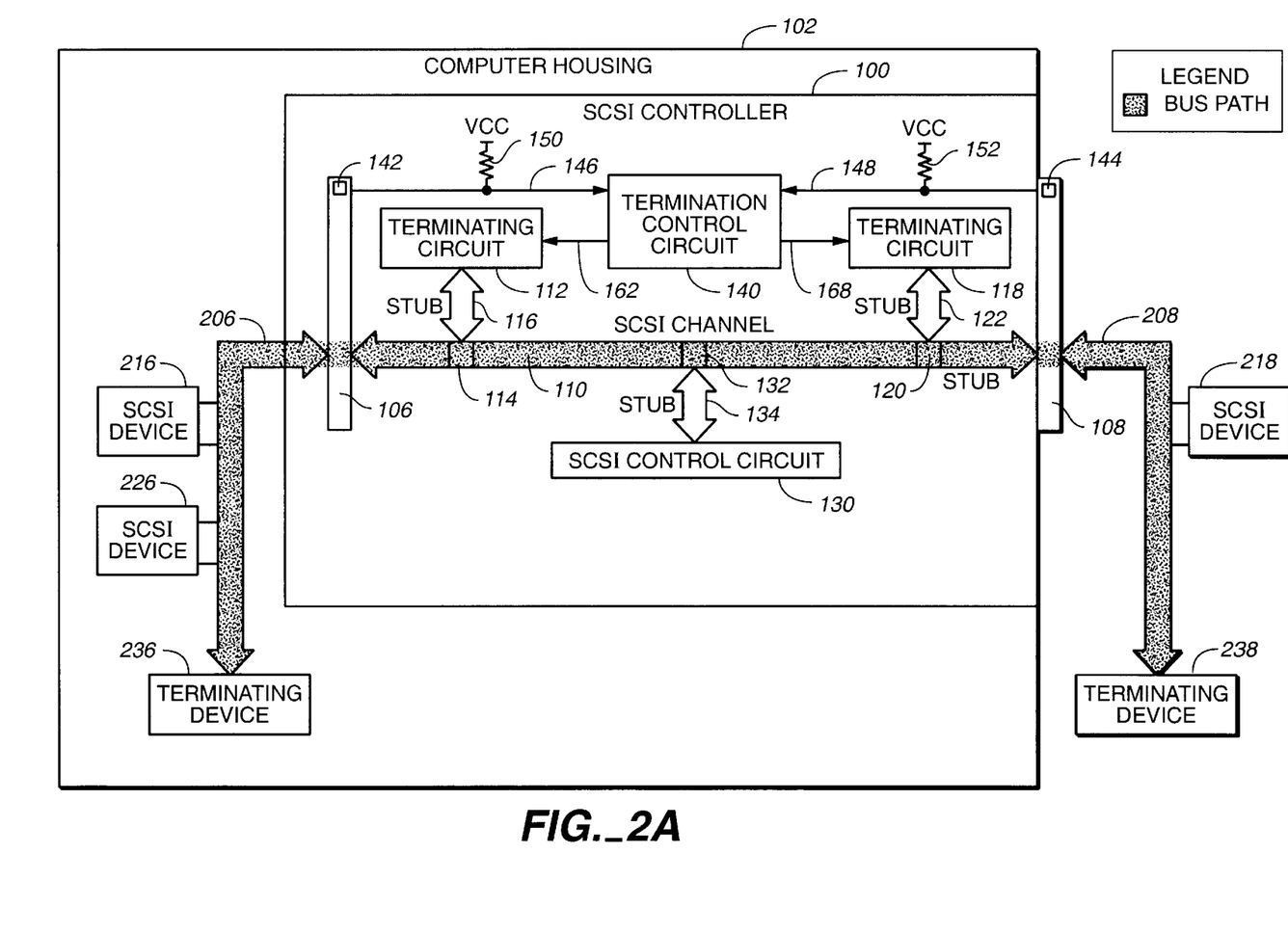
FIGS. 2A–2C show the bus path and stubs in the SCSI controller of FIG. 1 which result from properly terminating the SCSI bus under different bus configurations.
Figure 2B:
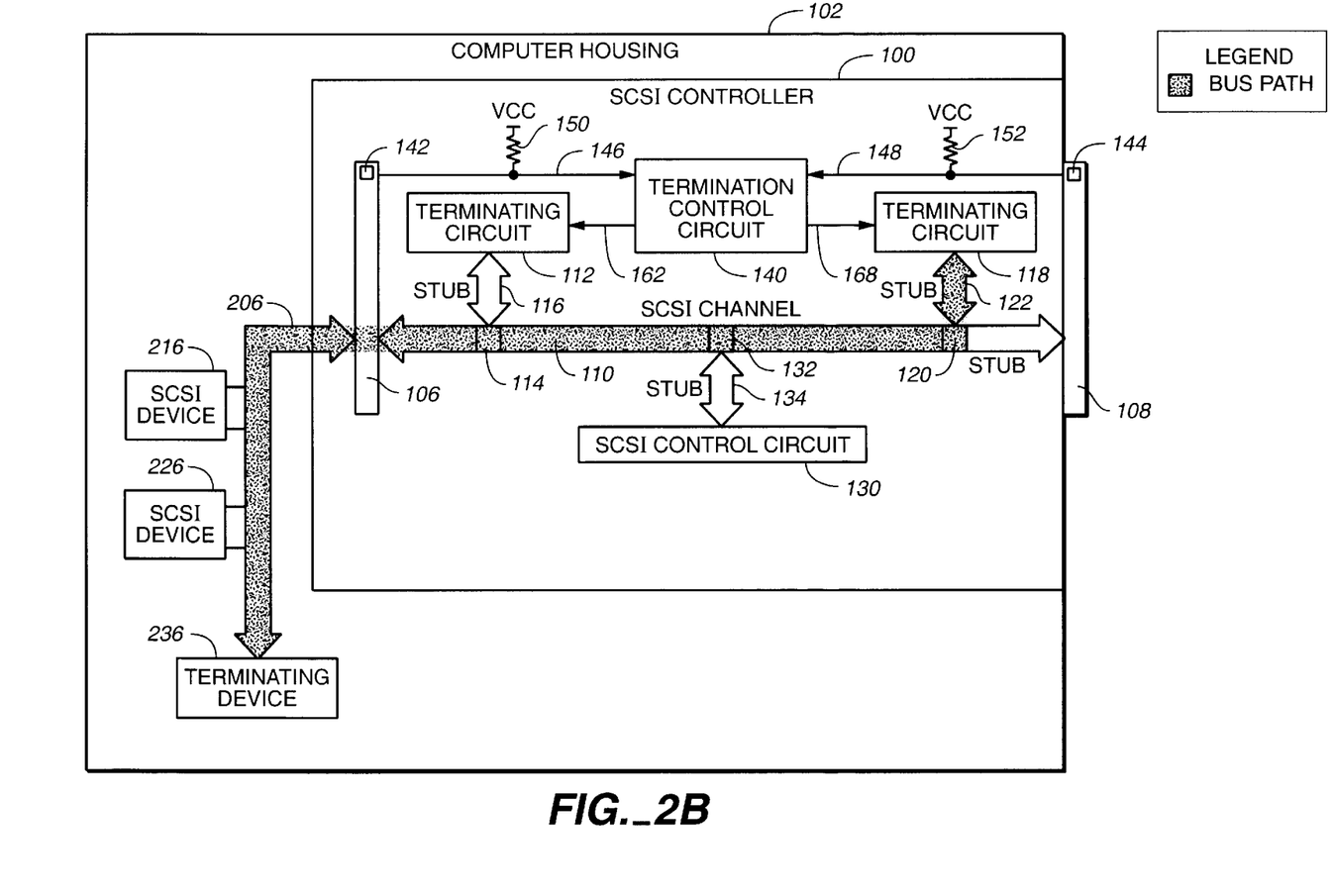
Figure 2C:
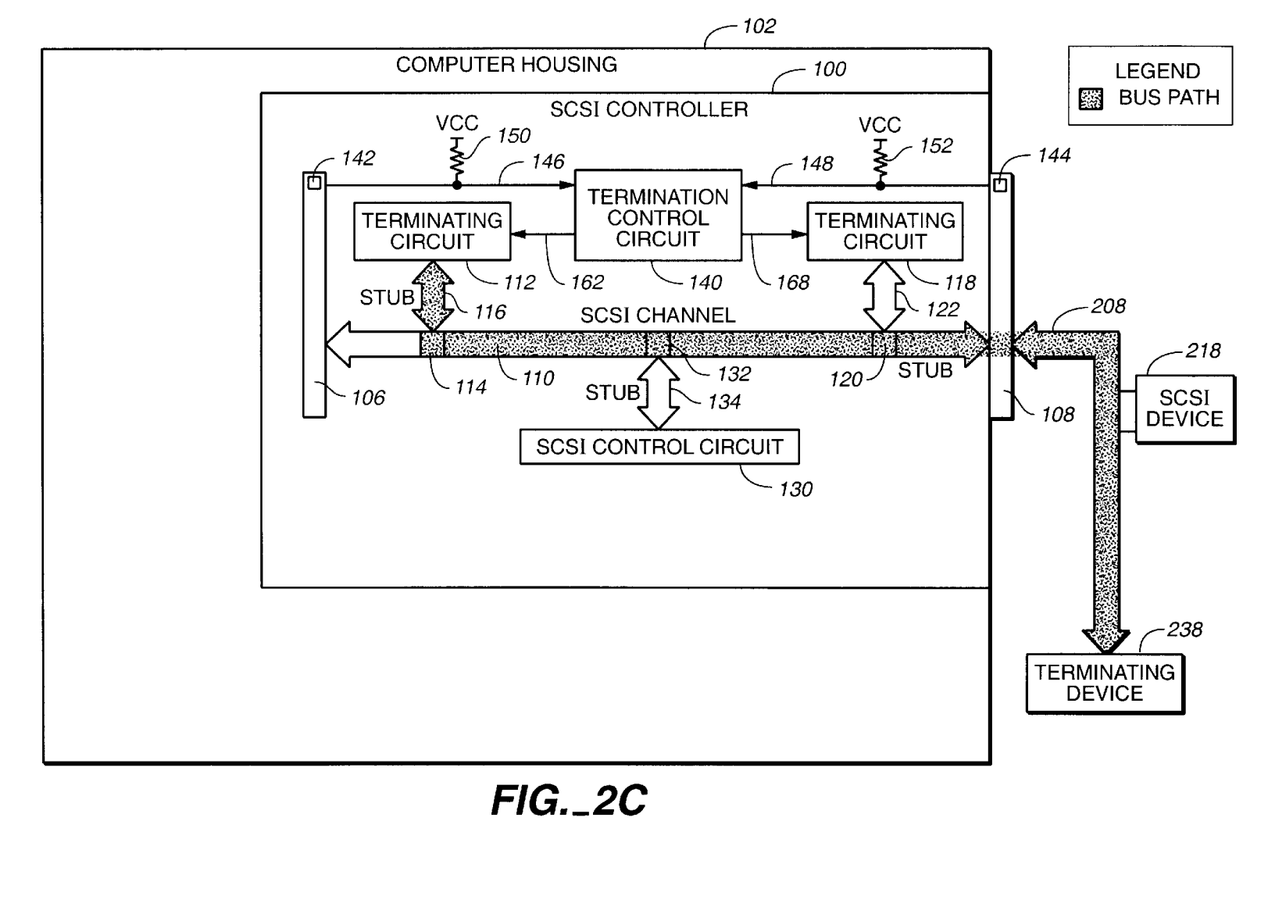

In order to appreciate how the SCSI 100 controller 100 maintains proper stub lengths within the SCSI controller 100, reference is made to FIGS. 2A, 2B, and 2C which illustrate the SCSI controller 100 in various SCSI bus configurations. For example, FIG. 2A illustrates a SCSI bus configuration in which the SCSI controller 100 resides in the middle of the SCSI bus. As illustrated, a first SCSI cable 206 couples a first LVD device 216, and a third LCD SCSI device 226 to the internal bus port 106. Similarly, a second SCSI cable 208 couples a second LVD SCSI device 218 (e.g. disk drive, CD-ROM drive, RAID device, scanner, printer) to the external bus port 108 of the SCSI controller 100.

As a result of SCSI devices being coupled to both the internal bus port 106 and the internal bus port 108, the termination control circuit 140 receives a low voltage signal on the internal presence line 146 and a low voltage signal on the external presence line 148. Accordingly, the termination control circuit 140 causes the terminating circuits 112, 118 of the SCSI controller 100 to not terminate the SCSI bus by generating high voltage signals on the enable lines 162, 168. (See Line 1 of TABLE 2.)

In order to maintain proper termination of the SCSI bus, however, a first LVD terminating device 236 is coupled to the first SCSI cable 206 after the second SCSI device 226 in order to appropriately terminate one end of the LVD SCSI bus, and a second LVD terminating device 238 is coupled to the second SCSI cable 208 after the third SCSI device 218 in order to appropriately terminate the other end of the LVD SCSI bus. It should be appreciated by those skilled in the art that the LVD SCSI devices 226, 218 may include mechanisms for coupling the LVD terminating devices 236, 236 to the LVD SCSI bus. For example, each LVD SCSI device may include a socket to which a terminating device may be manually inserted. Alternatively, each SCSI device may include a terminating device and a mechanism for selectively coupling the terminating device to the SCSI bus such as (i) a jumper or switch that may be used to manually enable the terminating device, or (ii) a sensing circuit that automatically enables the terminating device in response to sensing that the LVD SCSI device is at the end of the LVD SCSI bus.

Since the SCSI-II standard defines the SCSI bus path as the electrical path between the terminators that are terminating the SCSI bus, the above termination scheme results in a SCSI bus path that includes the first SCSI cable 206, the first bus port 106, the first SCSI channel 110, the second bus port 108, and the second SCSI cable 208. Moreover, since the SCSI-II standard defines a stub as any electrical path that is not part of the SCSI bus path, the first group of conductor lines 116 form a first stub, the second group of conductor lines 122 for a second stub, and the third group of conductor lines 134 form a third stub. Since the first group of conductor lines 116, the second group of conductor line 122, and the third group of conductor lines 134 are no greater than the maximum stub length allowed for an LVD SCSI bus, the resulting first stub, second stub, and third stub are no greater than the maximum stub length allowed for an LVD SCSI bus. Accordingly, the configuration of the LVD SCSI bus depicted in FIG. 2A results in a SCSI controller 100 having no stubs of a length greater than the maximum stub length allowed for a LVD SCSI bus.

FIG. 2B illustrates a SCSI bus configuration in which the SCSI controller 100 resides at one end of the SCSI bus. As illustrated, the main difference between the SCSI bus configurations of FIG. 2A and FIG. 2B is that in FIG. 2B no SCSI devices are coupled to the external bus port 108. As a result of no SCSI devices being coupled to the external bus port 108 and SCSI devices being coupled to the internal bus port 106, the termination control circuit 140 receives a low voltage signal on the internal presence line 146 and a high voltage signal on the external presence line 148. Accordingly, the termination control circuit 140 causes the first terminating circuit 112 to not terminate the SCSI bus by generating a high voltage signal on the first enable line 162. Moreover, the termination control circuit 140 causes the second terminating circuit 118 to terminate one end of the SCSI bus by generating a low voltage signal on the second enable line 168. (See Line 2 of TABLE 2.)

In order to maintain proper termination of the SCSI bus, the first LVD terminating device 236 is coupled to the first SCSI cable 206 after the second SCSI device 226 in order to appropriately terminate the other end of the LVD SCSI bus. As a result of the above termination of the LVD SCSI bus, the SCSI bus path includes the first SCSI cable 206, the internal bus port 106, the portion of the SCSI channel 110 between the first bus port 106 and the second stub connection 120, and the second group of conductors 122. Moreover, the first group of conductor lines 116 forms a first stub, the portion of the SCSI channel between the second stub connection 120 and the external bus port 108 forms a second stub, and the third group of conductor lines 134 forms a third stub.

Since the first group of conductor lines 116, and the third group of conductor lines 134 are no greater than the maximum stub length allowed for an LVD SCSI bus, the resulting first stub and third stub are no greater than the maximum stub length allowed for an LVD SCSI bus. Moreover, since the second stub connection 120 is located on the SCSI channel 110 no greater than a maximum stub length distance from the external bus port 108, the resulting second stub is no greater than the maximum stub length allowed for an LVD SCSI bus. Accordingly, the configuration of the LVD SCSI bus depicted in FIG. 2B results in a SCSI controller 100 having no stubs of a length greater than the maximum stub length allowed for a LVD SCSI bus.

FIG. 2C illustrates a SCSI bus configuration in which the SCSI controller 100 resides at one end of the SCSI bus. As illustrated, the main difference between the SCSI bus configurations of FIG. 2A and FIG. 2C is that in FIG. 2C no SCSI devices are coupled to the internal bus port 106. As a result of no SCSI devices being coupled to the internal bus port 106 and SCSI devices being coupled to the external bus port 108, the termination control circuit 140 receives a high voltage signal on the internal presence line 146 and a low voltage signal on the external presence line 148. Accordingly, the termination control circuit 140 causes the first terminating circuit 112 to terminate one end of the SCSI bus by generating a low voltage signal on the first enable line 162. Moreover, the termination control circuit 140 causes the second terminating circuit 118 to not terminate the SCSI bus by generating a high voltage signal on the second enable line 168. (See Line 3 of TABLE 2.)

In order to maintain proper termination of the SCSI bus, the second LVD terminating device 238 is coupled to the second SCSI cable 208 after the third SCSI device 218 in order to appropriately terminate the other end of the LVD SCSI bus. As a result of the above termination of the LVD SCSI bus, the SCSI bus path includes the second SCSI cable 208, the external bus port 108, the portion of the SCSI channel 110 between the external bus port 108 and the first stub connection 114, and the first group of conductor lines 116. Moreover the portion of the SCSI channel 110 between the internal bus port 106 and first stub connection 114 forms a first stub, the second group of conductor lines 122 forms a second stub, and the third group of conductor lines 134 forms a third stub.

Since the second group of conductor lines 122, and the third group of conductor lines 134 are no greater than the maximum stub length allowed for an LVD SCSI bus, the resulting second stub and third stub are no greater than the maximum stub length allowed for an LVD SCSI bus. Moreover, since the first stub connection 114 is located on the SCSI channel 110 no greater than a maximum stub length distance from the internal bus port 106, the resulting first stub is no greater than the maximum stub length allowed for an LVD SCSI bus. Accordingly, the configuration of the LVD SCSI bus depicted in FIG. 2C results in a SCSI controller 100 having no stubs of a length greater than the maximum stub length allowed for a LVD SCSI bus.

As should be appreciated from FIGS. 2A, 2B, and 2C, the SCSI controller 100 essentially complies with the maximum stub length requirements by selectively causing two terminating circuits 112, 118 to terminate the SCSI bus based upon which bus ports 106, 108 have SCSI devices coupled thereto. While a single terminating circuit such as the second terminating circuit 118 is all that would be required in order to achieve proper termination of the SCSI bus, a single terminating circuit makes it difficult if not impossible to layout the components of the SCSI controller 100 such that stubs resulting from all possible SCSI bus configurations are no greater than the maximum stub length.

Figure 3:
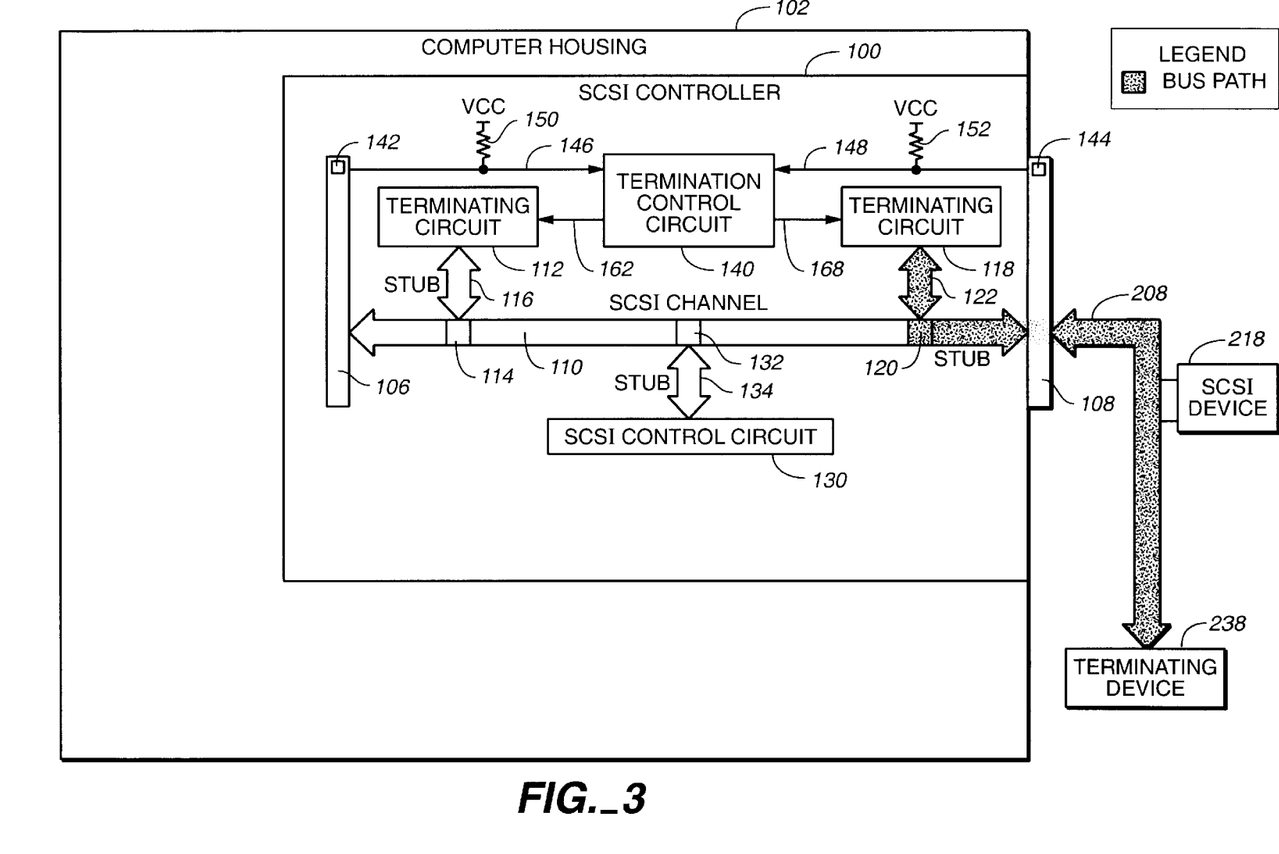
FIG. 3 shows the bus path and stubs in the SCSI controller of FIG. 1 which result from improperly terminating the SCSI bus under one bus configuration.

For example, FIG. 3 illustrates the resulting stubs that would occur if the SCSI controller 100 terminated the SCSI bus with the second terminating circuit 118 when no SCSI devices are coupled to the internal bus port 106 and SCSI devices are coupled to the external bus port 108. As depicted in FIG. 3, the SCSI bus is terminated at one end with the second terminating circuit 118 and is terminated at the other end with the second terminating device 238. As a result, the SCSI bus path includes the second SCSI cable 208, a first portion of the SCSI channel 110 between the second stub connection 120 and the external bus port 108, and the second group of conductor lines 122.

Moreover, the above termination results in (i) a first stub that includes the first group of conductor lines 116 and the portion of the SCSI channel 110 between the first stub connection 114 and the second stub connection 120, (ii) a second stub that includes the portion of the SCSI channel 110 between the internal bus port 106 and the second stub connection 120, and (iii) a third stub that includes the third group of conductor lines 134 and the portion of the SCSI channel 110 between the second stub connection 120 and the third stub connection 134. As can be seen in FIG. 3, the first, second, and third stubs are considerably longer than the stubs of FIGS. 2A, 2B, and 2C and are likely to be longer than allowed the maximum stub length for a LVD SCSI bus.

Figure 4:
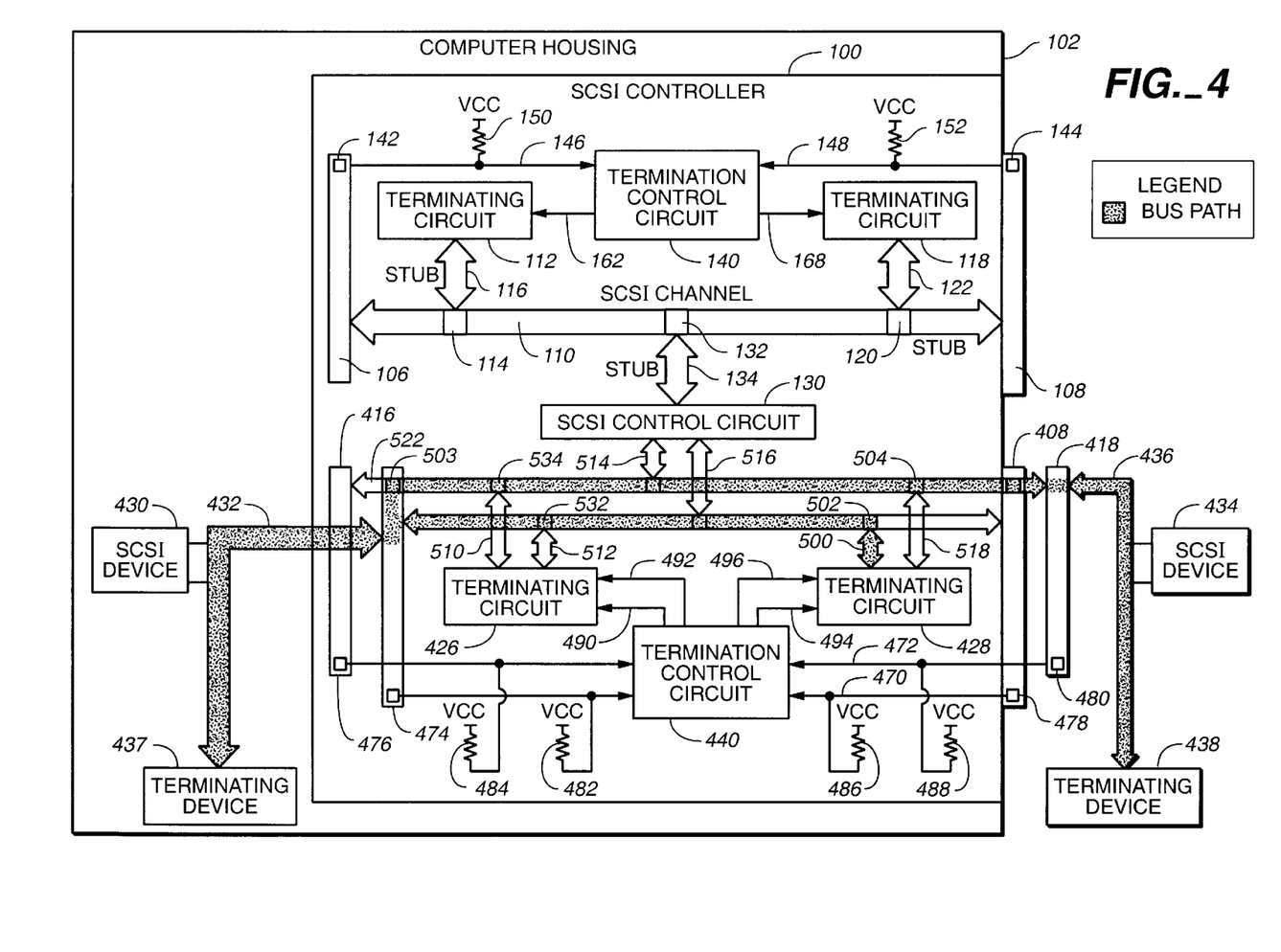
FIG. 4 shows a block diagram of a multi-port, multi-channel SCSI controller which incorporates features of the present invention therein.

The problem of arranging components of SCSI controllers so that proper stub lengths are maintained is amplified in multi-port, multi-channel controllers. FIG. 4 illustrates a multi-port, multi-channel SCSI controller 400 which incorporates features of the present invention therein. As illustrated, the SCSI controller 400 is located within a computer housing 402 and includes a control circuit 130, an internal bus port 106, an external bus port 108, terminating circuits 112, 118, and a first SCSI channel 110 that are essentially used to control a first SCSI bus in the manner described in regard to the SCSI controller 100 of FIG. 1. Accordingly, except for the control circuit 130, these components will not be discussed in further detail. As stated above, the control circuit 130, in the preferred embodiment, is a SCSI controller chip 53C896 available from Symbios Logic Inc., Ft. Collins, Colo. The SCSI controller chip 53C896 is actually a dual channel controller chip which is operable to control data transfers on two SCSI buses and is operable to control both wide transfers (16 data bits plus 2 parity bits) and narrow transfers (8 data bits plus 1 parity bit).

The SCSI controller 400 also includes components for controlling a second SCSI bus. In particular, the SCSI controller 400 includes an internal wide bus port 406, an internal narrow bus port 416, an external narrow bus port 408, and an external wide bus port 418. The SCSI controller 400 also includes a second SCSI channel 410 which electrically couples the four bus ports 406, 408, 416, 418 to each other. The internal wide bus port 406 is operable to couple wide LVD SCSI devices that are internal to the computer housing 402 to the second SCSI channel 410, and the internal narrow bus port 416 is operable to couple narrow LVD SCSI devices that are internal to the computer housing 402 to the second SCSI channel 410. Similarly, the external wide bus port 408 is operable to couple wide LVD SCSI devices that are external to the computer housing 402 to the second SCSI channel 410, and the external narrow bus port 418 is operable to couple narrow LVD SCSI devices that are external to the computer housing 402 to the second SCSI channel 410.

The SCSI controller 400 also includes two terminating circuits 426, 428 for terminating the second SCSI bus. The terminating circuits 426, 428 are used to terminate wide and narrow portions of the second SCSI bus if the SCSI controller 400 resides at one end of the wide or narrow portion of the second SCSI bus. The narrow portion of the second SCSI bus refers to the conductor lines common to transmitting both narrow data (i.e. 8 data bits plus 1 parity bit) and wide data (i.e. 16 data bits plus 1 parity bit). Specifically, referring back to TABLE 1, the narrow portion of the second SCSI bus refers to the conductor lines corresponding to the conductor contact numbers 6–30, and 40–64. The wide portion of the second SCSI bus refers to the additional conductor lines of the SCSI bus used to transmit wide data. Specifically, the wide portion of the second SCSI bus refers to the conductor lines corresponding to the conductor contact numbers 1–5, 31–39, and 65–68 of TABLE 1.

In a preferred embodiment of the invention, the terminating circuits 426, 428 each include four UCC5630 terminators manufactured by the Unitrode Corporation. Each UCC5630 terminator is a switchable LVD terminating circuit that includes an ENABLE input that when forced low (i.e. to electrical ground) causes the UCC5630 terminator to provide low voltage differential termination to 9 conductor line pairs that are coupled to the UCC5630 terminator. In particular, each terminating circuit 426, 428 uses two UCC5630 terminators to terminate the differential data and control lines of the narrow portion of the SCSI bus and two UCC5630 terminators to terminate the differential data lines of the wide portion of the second SCSI bus. Specifically, one UCC5630 terminator is used to terminate the conductor lines corresponding to conductor contact numbers 6–14 and 40–48, one UCC5630 terminator is used to terminate conductor lines corresponding to conductor contact numbers 21, 23–30, 55, and 57–64, one UCC5630 terminator is used to terminate conductor lines corresponding to conductor contact numbers 1–5 and 35–39, and one UCC5630 terminator is used to terminate conductor lines corresponding to conductor contact numbers 31–34 and 65–68. (See TABLE 1.) While the terminating circuits 426, 428 could terminate the second SCSI bus with just three UCC5630 chips, use of four UCC5630 chips simplifies the routing of the conductor lines and helps maintain conductor lines of substantially the same length which aids in preserving signal integrity on the second SCSI bus.

The SCSI controller 400 also includes a second termination control circuit 440. The second termination control circuit 440 is coupled to the internal wide bus port 406, the internal narrow bus port 416, the external wide bus port 408, and the external narrow bus port 418 via an internal wide presence line 466, an internal narrow presence line 468, an external wide presence line 470, and an external narrow presence line 472, respectively. The presence lines 466, 468, 470, 472 are each coupled to a ground pin 474, 476, 478, 480 of the respective bus port 406, 416, 408, 418. Moreover, the presence lines 466, 468, 470, 472 are each coupled to a voltage VCC (e.g. 5 volts) via a respective pull-up resistor 482, 484, 486, 488. As a result of this connection scheme, each presence line 466, 468, 470, 472 is (i) pulled down to a low value (i.e. ground) by a SCSI device when a SCSI device is coupled to the ground pin 474, 476, 478, 480 of the respective bus port 406, 416, 408, 418, and (ii) pulled up to a high value by the voltage VCC when a SCSI device is not coupled to the ground pin 474, 476, 478, 480 of the respective bus port 406, 416, 408, 418. Referring back to TABLE 1 which lists the various signal lines included in a LVD wide SCSI-II bus, the ground pins 474, 476, 478, 480 may be selected from the group of ground pins corresponding to connector contact numbers 15, 20, 22, 49, 54, and 56 without effecting the signal integrity of the SCSI bus.

The termination control circuit 440 is coupled (i) via a first narrow enable line 490 to the ENABLE inputs of the two UCC5630 terminators of the first terminating circuit 426 that are used to switchably terminate the narrow portion of the second SCSI bus, and (ii) via a first wide enable line 492 to the ENABLE inputs of the two UCC5630 terminators of the first terminating circuit 426 that are used to switchably terminate the wide portion of the SCSI bus. Similarly, the termination control circuit 440 is further coupled (i) via a second narrow enable line 494 to the ENABLE inputs of the two UCC5630 terminators of the second terminating circuit 428 that are used to switchably terminate the narrow portion of the second SCSI bus, and (ii) via a second wide enable line 496 to the ENABLE inputs of the two UCC5630 terminators used to switchably terminate the wide portion of the SCSI bus. The termination control circuit 440 is operable to selectively enable the terminators of the terminating circuits 426, 428 via the enable lines 490, 492, 494, 496 based upon the voltage levels of the presence lines 466, 468, 470, 472.

In particular, the termination control circuit 440 is operable to transmit a low voltage signal to the ENABLE inputs of the narrow portion terminators of the first terminating circuit 426 via the first narrow enable line 490 if the termination control circuit 440 determines that the first terminating circuit 426 should terminate the narrow portion the second SCSI bus. The termination control circuit 440 is operable to transmit a low voltage signal to the ENABLE inputs of the wide portion terminators of the first terminating circuit 426 via the first wide enable line 492 if the termination control circuit 440 determines that the first terminating circuit 426 should terminate the wide portion the second SCSI bus. Similarly, the termination control circuit 440 is operable to transmit a low voltage signal to the ENABLE inputs of the narrow portion terminators of the second terminating circuit 428 via the second narrow enable line 494 if the termination control circuit 440 determines that the second terminating circuit 428 should terminate the narrow portion of the second SCSI bus. Moreover, the termination control circuit 440 is operable to transmit a low voltage signal to the ENABLE inputs of the wide portion terminators of the second terminating circuit 428 via the second wide enable line 496 if the termination control circuit 440 determines that the second terminating circuit 428 should terminate the wide portion of the second SCSI bus. Specifically, the termination control circuit 440 generates the enable signals 490, 492, 494, 496 in accordance with TABLE 3, where "0" represents a low voltage signal (i.e. ground), "1" represents a high voltage signal (i.e. VCC), "Z" represents an illegal configuration for the second SCSI bus.

TABLE 3

| | Internal Narrow Presence Line 466 | Internal Wide Presence Line 468 | External Narrow Presence Line 470 | External Wide Presence Line 472 | First Narrow Enable Line 490 | First Wide Enable Line 492 | Second Narrow Enable Line 494 | Second Wide Enable Line 496 |
|---|---|---|---|---|---|---|---|---|
| 1 | 0 | 0 | 0 | 0 | Z | Z | Z | Z |
| 2 | 0 | 0 | 0 | 1 | Z | Z | Z | Z |
| 3 | 0 | 0 | 1 | 0 | Z | Z | Z | Z |
| 4 | 0 | 0 | 1 | 1 | Z | Z | Z | Z |
| 5 | 0 | 1 | 0 | 0 | Z | Z | Z | Z |
| 6 | 0 | 1 | 0 | 1 | 1 | 1 | 1 | 1 |
| 7 | 0 | 1 | 0 | 1 | 0 | 1 | 1 | 1 |
| 8 | 0 | 1 | 1 | 1 | 1 | 1 | 0 | 0 |
| 9 | 1 | 0 | 0 | 0 | Z | Z | Z | Z |
| 10 | 1 | 0 | 0 | 1 | 1 | 1 | 1 | 0 |
| 11 | 1 | 0 | 1 | 0 | 1 | 1 | 1 | 1 |
| 12 | 1 | 0 | 1 | 1 | 1 | 1 | 0 | 0 |
| 13 | 1 | 1 | 0 | 0 | Z | Z | Z | Z |
| 14 | 1 | 1 | 0 | 1 | 0 | 0 | 1 | 1 |
| 15 | 1 | 1 | 1 | 0 | 0 | 0 | 1 | 1 |
| 16 | 1 | 1 | 1 | 1 | 0 | 0 | 1 | 1 |

FIG. 4 also illustrates the SCSI bus path and stubs resulting from wide SCSI devices being coupled to the internal wide bus port 406 and narrow SCSI devices being coupled to the external narrow bus port 418. In particular, FIG. 4 depicts a wide SCSI device 430 coupled to the internal wide bus port 406 via a wide SCSI cable 432, and a narrow SCSI device 434 coupled to the external narrow bus port 418 via a narrow SCSI cable 436. In order to terminate the second SCSI bus properly, a wide terminating device 437 is coupled to the end of the wide SCSI cable 432, and a narrow terminating device 438 is coupled to the end of the narrow SCSI cable 436. Moreover, since SCSI devices are coupled to the bus ports 406, 418 and no SCSI devices are coupled to the bus ports 416, 408, the termination control circuit 440 receives presence signals and generates enable signals in accordance with Line 10 of TABLE 3.

As a result of generate enable signals in accordance with Line 10 of TABLE 3, the first terminating circuit 426 does not terminate the second SCSI bus, and the second terminating circuit 428 terminates only the wide portion of the second SCSI bus. Accordingly, the wide portion of the second SCSI bus path includes conductor lines 500 which couple the second terminating circuit 428 to the wide portion of the second SCSI channel 410, the wide portion of the second SCSI channel 410 between the first stub connection 502 and the internal wide bus port 406, the internal wide bus port 406, and the wide SCSI cable 432. Moreover, the narrow portion of the second SCSI bus path includes the narrow SCSI cable 438, the external narrow bus port 418, the narrow portion of the second SCSI channel 410, the internal wide bus port 406, and the wide SCSI cable 436. A first stub 510 and a second stub 512 are formed between the first terminating circuit 426 and the second SCSI channel 410, a third stub 514 and a fourth stub 516 are formed between the control circuit 130 and the second SCSI channel 410, a fifth stub 518 is formed between the narrow portion of the second SCSI channel and the second terminating circuit 428, a sixth stub 520 is formed between the first stub connection 502 and the external wide bus port 408, and a seventh stub 522 is formed between the stub connection 503 and the external narrow bus port 416.

It should be appreciated from FIG. 4 that by placing the control circuit 130 and the terminating circuits 426, 428 close enough to the second SCSI channel 410, one can ensure that the resulting stubs to these components are no greater than the maximum stub length allowed for the second SCSI bus. Moreover, by placing the stub connections 502, 504, 532, 534 close enough to their respective bus ports 408, 418, 406, 416, one can ensure that the resulting stubs to the bus ports 408, 418, 406, 416 are no greater than the maximum stub length allowed for the second SCSI bus.

It also should be appreciated be those skilled in the art that while narrow-to-wide SCSI adapters and narrow-to-wide SCSI cables enable a narrow LVD SCSI device to be coupled to a wide LVD bus port it is not recommended to couple a narrow LVD device to a wide bus port of the SCSI controller 400. This is because as may be seen from TABLE 1 above, there are no ground pins available in the wide portion of the LVD SCSI bus. All ground pins are located within the narrow portion of the LVD SCSI bus. Accordingly, the mechanism used by the SCSI controller 400 to detect presence of SCSI devices coupled to the bus ports is not able to determine whether a narrow LVD device instead of a wide LVD device is coupled to the wide LVD bus port. Accordingly, the SCSI controller 400 would not be able to detect all of the illegal SCSI bus configurations depicted in TABLE 3.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, the SCSI controllers 100, 400 may include mechanisms such as switches and jumpers that allow a user to override the termination control circuits 140, 440 and manually set the termination of the SCSI buses. These mechanisms for manually setting termination may even replace the termination control circuits 140, 440 entirely. Moreover, SCSI controllers that utilize different (i) bus port combinations, (ii) bus widths (e.g. wide, narrow), (iii) bus types (e.g. LVD, HVD), and (iv) number of channels may still benefit from various features of the present invention.

What is claimed is:

1. A method of preserving signal integrity of buses, comprising the steps of:

forming between a first bus and a first bus port of a bus controller, a first stub that is no greater than a first maximum stub length allowed for said first bus by terminating said first bus with a first terminating circuit if (i) said first bus port does not have at least one device coupled thereto, and (ii) a second bus port of said bus controller does have at least one device coupled thereto; and forming between said first bus and a second bus port of said bus controller, a second stub that is no greater than said first maximum stub length allowed by terminating said first bus with a second terminating circuit if (i) said first bus port does have at least one device coupled thereto, and (ii) said second bus port does not have at least one device coupled thereto.

2. The method of claim 1, further comprising the steps of (i) generating a first control signal if said first bus port does not have at least one device coupled thereto, and (ii) generating a second control signal if said second bus port does have at least one device coupled thereto, wherein said first stub forming step comprises the step of:

causing said first terminating circuit to terminate said first bus in response to (i) said first control signal generating step generating said first control signal, and (ii) said second control signal generating step generating said second control signal.

3. The method of claim 1, wherein:

said first stub forming step comprises the step of causing said first stub to be no greater than three inches by terminating said first bus within three inches from said first bus port if said first bus port does not have at least one device coupled thereto, and said second stub forming step comprises the step of causing said second stub to be no greater than three inches by terminating said first bus within three inches from said second bus port if said second bus port does not have at least one differential device coupled thereto.

4. The method of claim 1, further comprising the steps of (i) generating a first control signal if said first bus port has at least one differential device of (a) a first data width, or (b) a second data width coupled thereto, and (ii) generating a second control signal if said second bus port does not have at least one device coupled thereto, wherein:

said first bus comprises (i) a first data width portion for transmitting differential data signals representative of first data of said first data width, and (ii) a second data width portion for transmitting differential data signals representative of second data of said second data width, said second data width portion being greater than and including said first data width, said first stub forming step comprises the step of causing said second terminating circuit to terminate said second data width portion of said first bus in response to (i) said first control signal generating step generating said first control signal, and (ii) said second control signal generating step generating said second control signal.

5. The method of claim 1, further comprising the steps of (i) generating a first control signal if said first bus port does have at least one differential device of a first data width coupled thereto, (ii) generating a second control signal if said second bus port does have at least one differential device of said second data width coupled thereto, and (iii) generating a third control signal if a third bus port of said bus controller does not have at least one differential device of a second data width coupled thereto, wherein:

said first bus comprises (i) a first data width portion for transmitting differential data signals representative of first data of said first data width, and (ii) a second data width portion for transmitting differential data signals representative of second data of said second data width, said second data width portion comprising said first data width portion and an additional data width portion, and said first stub forming step comprises the step of causing said second terminating circuit to terminate said additional data width portion within said maximum stub length distance from said third bus port in response to (i) said first control signal generating step generating said first control signal, (ii) said second control signal generating step generating said second control signal, and (iii) said third control signal generating step generating said third control signal.

6. The method of claim 1, further comprising the steps of:

forming between a second bus and a third bus port of the bus controller, a third stub that is no greater than a second maximum stub length allowed for said second bus by terminating said second bus with a third terminating circuit if (i) said third bus port does not have at least one device coupled thereto, and (ii) a fourth bus port of said bus controller does have at least one device coupled thereto; and forming between said second bus and said fourth bus port, a fourth stub that is no greater than said second maximum stub length by terminating said second bus with a fourth terminating circuit if (i) said third bus port does have at least one device coupled thereto, and (ii) said fourth bus port does not have at least one device coupled thereto.

7. A method of preserving signal inegrity of buses, comoprising the steps of:

generating a first control signal if a first bus port of a bus controller does not have at least one device coupled thereto;

generating a second control signal if a first bus port of a bus controller does not have at least one device coupled thereto;

forming between a first bus and said first bus port, a first stub that is not greater than a first maximum stub length allowed for said first bus by terminating said first bus with a first terminating circuit in response to said first control signal generating step generating said first control signal; and forming between said first bus and said second bus port, a second stub that is no greater than said first maximum stub length by terminating said first bus with a second terminating circuit in response to said second control signal generating step generating said second control signal.

8. The method of claim 7, wherein said first stub forming step comprises the step of:

causing said first terminating circuit to terminate said first bus in response to (i) said first control signal generating step generating said first control signal, (ii) said second control signal generating step generating said first control signal.

9. The method of claim 7, wherein said first stub forming step comprises the step of:

causing said first stub to no greater than three inches by terminating said first bus within three inches from said first bus port in response to said first control signal generating step generating said first control signal.

10. The method of claim 7, further comprising the step of:

forming between a second bus and said second bus port, a second stub that is not greater than a second maximum stub length allowed for said second bus by terminating said second bus with a second terminating circuit in response to said second control signal generating step generating said second control signal.

11. The method of claim 7, further comprising the steps of generating a second control signal if said second bus port has at least one differential device of (a) a first data width, or (b) a second data width coupled thereto, wherein:

said first bus comprises (i) a first data width portion for transmitting differential data signals representative of first data of said first data width, and (ii) a second data width portion for transmitting differential data signals representative of second data of said second data width, said second data width portion being greater than and including said first data width, said first stub forming step comprises the step of causing said first terminating circuit to terminate said second data width portion of said first bus in response to (i) said first control signal generating step generating said first control signal, and (ii) said second control signal generating step generating said second control signal.

12. The method of claim 7, further comprising the steps of (i) generating a second control signal if said second bus port has at least one differential device of a first data width coupled thereto, and (ii) generating a third control signal if a third bus port of said bus controller has at least one differential device of a second data width coupled thereto, wherein:

said first bus comprises (i) a first data width portion for transmitting differential data signals representative of first data of said first data width, and (ii) a second data width portion for transmitting differential data signals representative of second data of said second data width, said second data width portion comprising said first data width portion and an additional data width portion, and said first stub forming step comprises the step of causing said first terminating circuit to (a) not terminate said first data width portion, and (b) terminate said additional data width portion within said maximum stub length distance from said second bus port in response to (i) said first control signal generating step generating said first control signal, (ii) said second control signal generating step generating said second control signal, and (iii) said third control signal generating step generating said third control signal.

13. A bus controller for interfacing buses, comprising:

a first bus port operable to couple to devices;

a second bus port operable to couple to devices;

a first bus channel coupled between said first bus port and said second bus, said first bus channel comprising a first bus portion of a first bus;

a first terminating circuit coupled to a first stub connection of said first bus channel via a first group of conductor lines that are no greater than a first maximum stub length allowed for said first bus, said first stub connection being located on said first bus channel within said first maximum stub length from said first bus port, said first terminating circuit operable to selectively terminate said first bus in response to a first control signal;

a second terminating circuit coupled to a second stub connection of said first bus channel via a second group of conductor lines that are no greater than said first maximum stub length, said second stub connection being located on said first bus channel within said first maximum stub length from said second bus port, said first terminating circuit operable to selectively terminate said first bus in response to a second control signal; and a control circuit coupled to said first bus channel with a first stub that is no greater than said first maximum stub length, said control circuit operable to control said first bus.

14. The bus controller of claim 13, further comprising:

a first termination control circuit coupled to said first bus port and said second bus port, said first termination control circuit operable to generate said first control signal if (i) said first bus port does not have at least one device coupled thereto, and (ii) said second bus port does have at least one device coupled thereto.

15. The bus controller of claim 14, wherein:

said first termination control circuit is further operable to generate said second control signal if (i) said first bus port does have at least one device coupled thereto, and (ii) said second bus port does not have at least one device coupled thereto.

16. The bus controller of claim 13, wherein said control circuit is further coupled to a second bus channel with a second stub that is no greater than a second maximum stub length allowed for a second differential bus, said control circuit operable to control said second differential bus, further comprising:

a third bus port operable to couple to devices;

a fourth bus port operable to couple to devices;

a second bus channel coupled between said third bus port and said fourth bus port, said second bus channel comprising a second bus portion of said second differential bus;

a third terminating circuit coupled to a third stub connection of said second bus channel via a third group of conductor lines that are no greater than said second maximum stub length, said third stub connection being located on said second bus channel within said second maximum stub length from said third bus port, said third terminating circuit operable to selectively terminate said second differential bus in response to a third control signal; and a fourth terminating circuit coupled to a fourth stub connection of said second bus channel via a fourth group of conductor lines that are no greater than said second maximum stub length, said fourth stub connection being located on said second bus channel within said second maximum stub length from said fourth bus port, said fourth terminating circuit operable to selectively terminate said second bus in response to a fourth control signal.

17. The bus controller of claim 16, wherein:

said first stub is no greater than three inches in length, said second stub is no greater than three inches in length, said conductor lines of said first group of conductor lines are each no greater than three inches in length, said conductor lines of said second group of conductor lines are each no greater than three inches in length, said conductor lines of said third group of conductor lines are each no greater than three inches in length, and said conductor lines of said fourth group of conductor lines are each no greater than three inches in length.

18. The bus controller of claim 16, further comprising:

a first termination control circuit coupled to said first bus port and said second bus port, said first termination control circuit operable to generate said first control signal if (i) said first bus port does not have at least one device coupled thereto, and (ii) said second bus port does have at least one device coupled thereto; and a second termination control circuit coupled to said third bus port and said fourth bus port, said second termination control circuit operable to generate said third control signal if (a) said third bus port does not have at least one device coupled thereto, and (b) said fourth bus port does have at least one device coupled thereto.

19. The bus controller of claim 18, wherein:

said first termination control circuit is further operable to generate said second control signal if (i) said first bus port does have at least one device coupled thereto, and (ii) said second bus port does not have at least one device coupled thereto, and said second termination control circuit is further operable to generate said fourth control signal if (i) said third bus port does have at least one device coupled thereto, and (ii) said fourth bus port does not have at least one device coupled thereto.

20. The bus controller of claim 13, further comprising a third bus port operable to couple to differential devices of a first data width, wherein:

said first bus comprises a first data width portion for transmitting first differential data signals representative of first data of said first data width, and a second data width portion for transmitting differential data signals representative of second data of a second data width, said second data width portion said first data width portion and an additional data width portion, said second bus port is further operable to couple to differential devices of said first data width, and said first termination control circuit is operable to generate said first control signal if (i) said first bus port does not have a differential device coupled thereto, (ii) said second bus port does have a differential device of said first data width coupled thereto, and (iii) said third bus port does have a differential device of said second data width coupled thereto.

* * * * *